United States Patent
Matsumoto et al.

(10) Patent No.: US 6,484,946 B2
(45) Date of Patent: *Nov. 26, 2002

(54) IC CARD INFORMATION DISPLAY DEVICE AND IC CARD FOR USE THEREWITH

(75) Inventors: Kenji Matsumoto, Yokohama (JP); Shigeyuki Ito, Zushi (JP); Yutaka Takami, Yokohama (JP); Masayuki Inoue, Fujisawa (JP); Koichi Yoneta, Yokohama (JP); Tetsuharu Inamitsu, Chigasaki (JP); Masaru Ohki, Tokorozawa (JP)

(73) Assignees: Hitachi, Ltd., Tokyo (JP); Hitachi Video and Information Systems, Inc., Yokohama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/217,817

(22) Filed: Dec. 22, 1998

(65) Prior Publication Data

US 2002/0139861 A1 Oct. 3, 2002

(30) Foreign Application Priority Data

Dec. 22, 1997 (JP) .............................................. 9-352663

(51) Int. Cl.[7] .............................................. G06K 19/06
(52) U.S. Cl. ....................................... 235/492; 235/380
(58) Field of Search ................................. 235/380, 492

(56) References Cited

U.S. PATENT DOCUMENTS

| | | | | |
|---|---|---|---|---|
| 4,885,788 A | * | 12/1989 | Takaragi et al. | 380/23 |
| 4,928,001 A | * | 5/1990 | Masada | 235/380 |
| 5,473,690 A | * | 12/1995 | Grimonprez et al. | 380/24 |
| 5,615,381 A | * | 3/1997 | Iijima | 710/260 |
| 5,682,027 A | * | 10/1997 | Bertina et al. | 235/380 |
| 5,912,453 A | * | 6/1999 | Gungl et al. | 235/492 |

FOREIGN PATENT DOCUMENTS

JP        392966        4/1991

OTHER PUBLICATIONS

W. Rankl and W. Effing *Smart Card Handbook* John Wiley & Sons, (1997), pp. 107–130 and 265–272.*

*EMV '96* Integrated Circuit Card, Terminal, and Application Specifications, Version 3.0, Jun. 30, 1996, Part II–IV.*

* cited by examiner

*Primary Examiner*—Mark Tremblay
(74) *Attorney, Agent, or Firm*—Antonelli, Terry, Stout & Kraus, LLP

(57) ABSTRACT

Premium point services offered by different retailers require each user to possess a plurality of cards for dealing with different applications. An electronic pocketbook system made of a display device and an IC card is provided to store diverse kinds of application information such as amount information and point information into a single IC card. Portions of the application information to be displayed are stored in a predetermined format into a predetermined area inside the IC card. This allows the same program of the display device to display various kinds of application information successively using a common program, and without having to an application specific program.

19 Claims, 19 Drawing Sheets

DIR file

| Record Number | Application |
|---|---|
| 1 | Application 1 |
| 2 | Application 2 |
| 3 | Application 3 |
| ⋮ | ⋮ |

FIG.7

(a) Read DIR Record command

| CLA | INS | P1 | P2 | Lc | Le |
|-----|-----|----|----|----|----|
| C0  | B2  | x1 | 04 | -  | x2 | x1: Record number
x2: Le length (b) Read DIR Record response

Le Data

| Tag | Length | Records |
|-----|--------|---------|
| 61  | (x2-2)byte | - |
| 4F  | 1-16byte | Application ID |
| :   | :      | :       |
| 50  | 0-16byte | Data1 |
| 50  | 0-16byte | Data2 |

Status

| SW1 | SW2 |
|-----|-----|
| s1  | s2  | s1: SW1
s2: SW2

FIG.8

(a) Select File command

| CLA | INS | P1 | P2 | Lc | Le |
|-----|-----|----|----|----|----|
| 00  | A4  | 04 | C0 | x1 | x2 | x1:Lc length
x2:FCI record length

Lc data

| Length | Records |
|--------|---------|
| x1 | Application ID |

(b) Select File response

FCI record

| Tag | Length | Records |
|-----|--------|---------|
| 6F | (x2-2)byte | — |
| 84 | 1-16byte | Application LD |
| ⋮ | ⋮ | ⋮ |
| 50 | 0-16byte | Data1 |
| 50 | 0-16byte | Data2 |

Status

| SW1 | SW2 |
|-----|-----|
| s1 | s2 | s1:SW1
s2:SW2

FIG.9

(a) Get File Data command

| CLA | INS | P1 | P2 | Lc | Le |
|-----|-----|----|----|----|----|
| x1  | x2  | x3 | x4 | –  | x5 | x1:CLA
x2:INS
x3:P1
x4:P2
x5:Le length (b) Get File Data response
   Le Data

| Tag | Length    | Records        |
|-----|-----------|----------------|
| 61  | (x5-2)byte| –              |
| 4F  | 1-16byte  | Application ID |
| :   | :         | :              |
| 50  | 0-16byte  | Data1          |
| 50  | 0-16byte  | Data2          |

Status

| SW1 | SW2 |
|-----|-----|
| s1  | s2  | s1:SW1
s2:SW2

FIG.10

(a) Change DIR Record command

| CLA | INS | P1 | P2 | Lc | Le |
|-----|-----|----|----|----|----|
| x1  | x2  | x3 | x4 | x5 | —  | x1:CLA
x2:INS
x3:Record number
x4:P2
x5:Lc length

Lc Data

| Tag | Length | Records |
|-----|--------|---------|
| 61  | (x5-2)byte | — |
| 4F  | 1-16byta | Application ID |
| ⋮   | ⋮      | ⋮       |
| 50  | 0-16byte | Old Data1 |
| 55  | 0-16byte | New Data1 |
| 50  | 0-16byte | Old Data2 |
| 55  | 0-16byte | New Data2 |

(b) Change DIR Record response
Status

| SW1 | SW2 |
|-----|-----|
| s1  | s2  | s1:SW1
s2:SW2

FIG.11

(a) Change FCI record command

| CLA | INS | P1 | P2 | Lc | Le |
|-----|-----|----|----|----|----|
| x1 | x2 | x3 | x4 | x5 | — | x1:CLA
x2:INS
x3:P1
x4:P2
x5:Lc length

Lc Data

| Tag | Length | Records |
|-----|--------|---------|
| 6F | (x5-2)byte | — |
| 84 | 1-16byta | Application ID |
| . | . | . |
| 50 | 0-16byta | Old Data1 |
| 55 | 0-16byta | New Data1 |
| 50 | 0-16byta | Old Data2 |
| 55 | 0-16byta | New Data2 |

(b) Change FCI record response

Status

| SW1 | SW2 |
|-----|-----|
| s1 | s2 | s1:SW1
s2:SW2

FIG.12

(a) Change File Data command

| CLA | INS | P1 | P2 | Lc | Le |
|-----|-----|----|----|----|----|
| x1  | x2  | x3 | x4 | x5 | —  | x1:CLA
x2:INS
x3:P1
x4:P2
x5:Lc length

Lc Data

| Tag | Length      | Records        |
|-----|-------------|----------------|
| 61  | (x5-2)byte  | —              |
| 4F  | 1-16byte    | Application ID |
| ⋮   | ⋮           | ⋮              |
| 50  | 0-16byte    | Old Data1      |
| 55  | 0-16byte    | New Data1      |
| 50  | 0-16byte    | Old Data2      |
| 55  | 0-16byte    | New Data2      |

(b) Change File Data response

Status

| SW1 | SW2 |
|-----|-----|
| s1  | s2  | s1:SW1
s2:SW2

FIG.15

| 1 | "E-MONEY", @NEXT, "1,000", @NEXT, "JPY", @END |
|---|---|
| 2 | "A-SHOP", @NEXT, "30,000P", @END |
| 3 | "B-FLIGHT", @ENXT, "22,000M", @END |

IC CARD INFORMATION DISPLAY DEVICE AND IC CARD FOR USE THEREWITH

FIELD OF THE INVENTION

The present invention generally relates to an integrated circuit (IC) card, IC card information display device, an IC card reader/writer and an IC card system, and more particularly relates to an IC card, IC card information display device, IC card reader/writer and IC card system for successively accessing and displaying information about a plurality of applications (such as electronic money information and premium point information) from a common IC card.

BACKGROUND OF THE INVENTION

Recently, so-called premium point plans (e.g., frequent use/purchase plans, frequent flyer plans) are gaining wide acceptance. They work as follows. Every time a user buys merchandise and/or utilizes a service at a participating business (e.g., retailer), such business awards the user premium points which correspond to the amount of the purchase/use, and appropriate premium point information is recorded on a suitable medium. When a sufficient amount of premium points has accumulated, the user subsequently swaps the same for a product/service of matching value. Such plans are intended to encourage customers to repeat their purchases or use of a specific business, e.g., company or chain of stores. The trouble is that such plans are offered by many businesses using magnetic cards, plastic wallet cards, etc., and a customer enrolled in a plurality of plans is forced to carry many so-called point cards specific to the businesses they frequent, thus representing a large inventory of cards which take up substantial space within a user's wallet. As a further disadvantage, often these dedicated cards must be read by dedicated display devices (e.g., located within a retailer's place of business) using dedicated programs, thus making it inconvenient for a user to check the status of his/her card.

Meanwhile, as discussed in Japanese Published Unexamined Patent Application No. Hei 3-92966, studies have been under way to implement totally "cashless" commercial transactions through the use of an IC card storing electronic money, IC card apparatuses and an IC card system.

A system of interest in the present disclosure involves getting specifically designated amount information written to a memory in an IC card, with such amount information representing, in essence, electronic money. When a customer is to settle a purchase, the necessary amount information is deducted and transmitted from the customer's IC card to the system, whereby the transaction is completed without the intervention of cash.

Turning now to problems to be solved by the invention, if such an electronic IC card money system is implemented for settling commercial transactions, it is also possible to have the IC cards used by the system to also carry other diverse applications and data along with an electronic money application and data, i.e., it is possible to have a multi-application IC card. This means that other information such as the above-mentioned dedicated programs and premium point information may also be stored in the IC card. If a new application is added to the IC card, the display device also needs to have a new display control program added thereto. To accommodate loading/unloading of diverse programs, the display device must be equipped with a flash memory or like function to deal with that need.

However, problems have been found in attempting to implement a multi-application IC card system. More particularly, portable remote terminals such as a low-cost IC card reader have only limited functions including a display panel and keys. As such, these terminals may be incapable of separately displaying multiple kinds of application information or allowing users to select desired application information. Further, even if a reader is capable of allowing a user to select between multiple kinds of application information, a user has to separately access multiple dedicated programs (e.g., often requiring entry of respective passwords) in order for the user to review basic personal information (e.g., electronic money account balance, frequent flyer milage, accumulated premium points) from each of the application programs. This is inconvenient and time consuming.

SUMMARY OF THE INVENTION

The objection of the present invention is to provide a multi-application IC card, IC card display device, IC card reader/writer and IC card system, wherein select information (e.g., balance amounts) can be easily and conveniently accessed/displayed without having to access/utilize separate application specific programs.

Further, it is an object of the present invention to provide an arrangement wherein even IC card readers and IC card reader/writers not having a specific application program matching a specific application provided on a multi-application IC card, can still access/display select information pertaining to that application.

Further, it is an object to supply such arrangement for use even with an inexpensive IC card reader display device, like a balance indicator which is small and has limited functions.

It is therefore an object of the present invention to overcome the above and other deficiencies of the art and to provide a unique and novel multi-application IC card, IC card reader, IC card reader/writer and IC card system with easy and convenient multi-application information reading capabilities. In carrying out the invention and according to one aspect thereof, there is provided an IC card having memory, including: a first memory area in which respective application information for a plurality of applications is stored as data which is each readable/writable by an application program corresponding to the application information; and a second memory area in which predetermined portions of the application information is stored as data in a predetermined form which is readable by a predetermined common program; wherein the predetermined portions stored in the second memory area are created on a basis of the application information stored in the first memory area.

Preferably, the plurality of kinds of balance information may be stored in the IC card as character code information in a standardized format, and the display may display information corresponding to the character code information. Furthermore, the balance information may be stored in specific areas such as a directory file, an answer-to-reset file, or elementary files in the IC card.

As outlined above, a single IC card according to the invention allows a user to keep a single IC card containing information about a plurality of applications such as electronic money information and premium point information. A display device according to the invention allows the user to select and display information about any one of the multiple applications stored in the IC card. When display data (i.e., character, numeric, etc. data) are stored in predetermined areas of the IC card in a standardized format, a functionally limited display device such as a balance indicator may be used to acquire and display necessary application information from the IC card using a simplified control procedure. A common control program need only be used to display information about diverse applications. When a new application is additionally stored into the IC card, the same control program of the display device may still be used to display information about the newly added application. The inventive display device is thus capable of addressing information about a plurality of applications without using a flash memory or the like that has been required by comparable display devices.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure hereof this invention. While the foregoing and following written and illustrated disclosure focuses on disclosing exemplary embodiments of the invention, it should be clearly understood that the same is by way of illustration and example only and is not to be taken by way of limitation, the spirit and scope of the present invention being limited only by the terms of the appended claims. The following represents brief descriptions of the drawings, wherein:

FIG. 7 illustrates tables showing one way of accessing/storing display data by use of the inventive IC card information display device;

FIG. 8 illustrates tables showing another way of accessing/storing display data by use of the inventive IC card information display device;

FIG. 9 illustrates tables showing another way of accessing/storing display data by use of the inventive IC card information display device;

FIG. 10 illustrates tables depicting one way of updating display data by use of the inventive IC card information display device;

FIG. 11 illustrates tables depicting another way of updating display data by use of the inventive IC card information display device;

FIG. 12 illustrates tables depicting another way of updating display data by use of the inventive IC card information display device;

FIG. 15 is a table showing another way of accessing/storing display data by use of the inventive IC card information display device;

DETAILED DESCRIPTION

Figure 1:
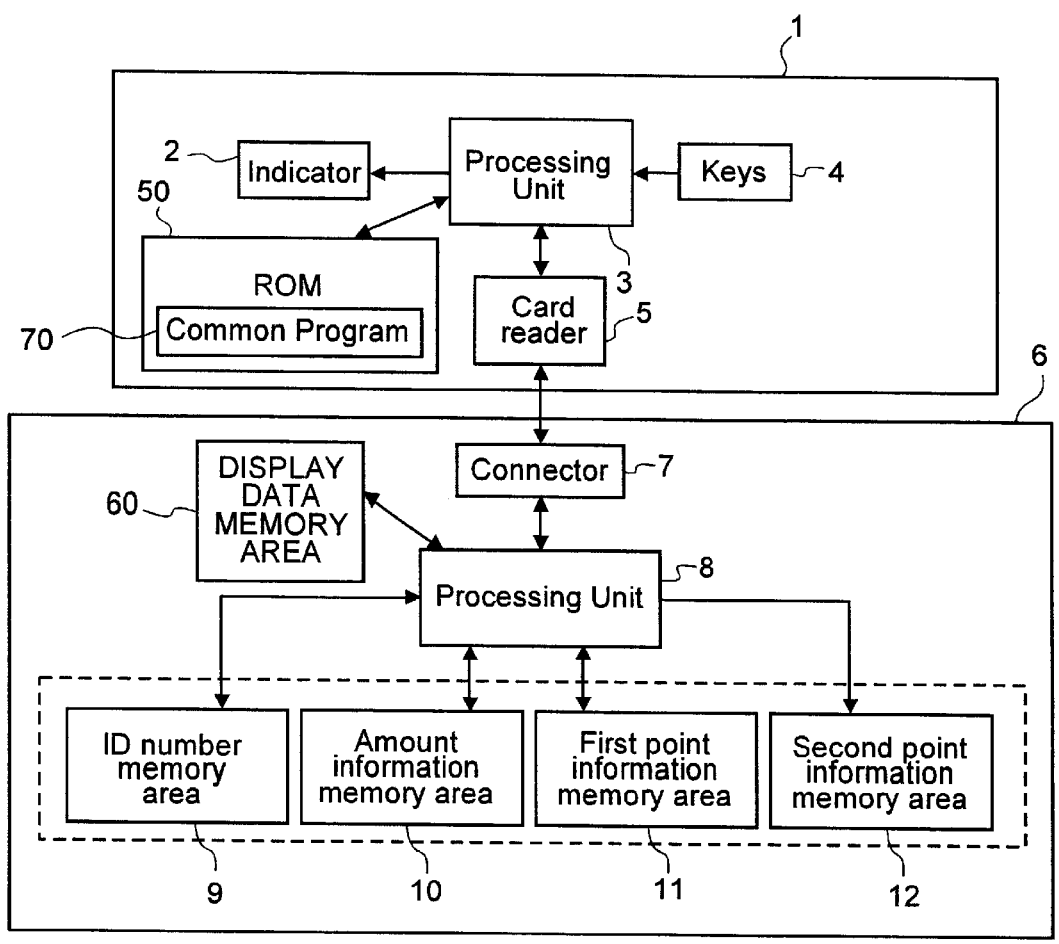
FIG. 1 is a block diagram of an IC card information display device embodying the invention.

Before beginning a detailed description of the subject invention, mention of the following is in order. When appropriate, like reference numerals and characters are used to designate identical, corresponding or similar components in differing figure drawings.

Figure 19:
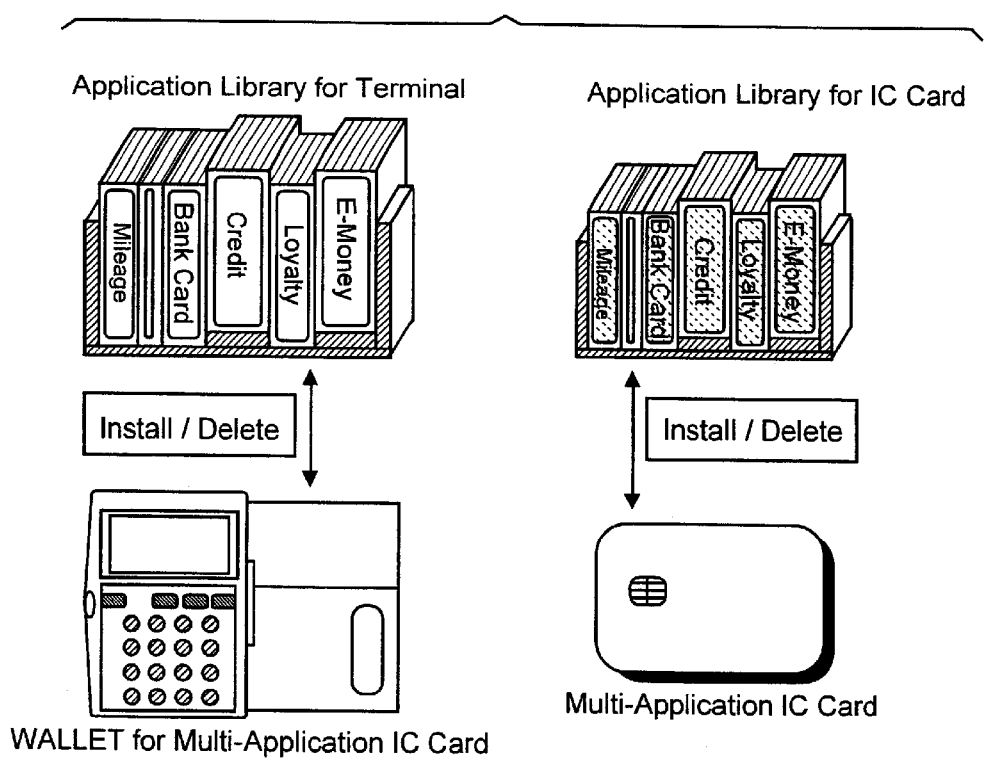
FIG. 19 is a schematic view showing installation/deletion of applications from application libraries with respect to an IC reader/writer and an IC card.

Exemplary embodiments of this invention will now be described with reference to the provided drawing figures. As further relevant background discussion, attention is directed to FIG. 19 for explanation of a multi-application IC card and multi-application reader/writer (e.g., wallet). More particularly, in the right-hand portion of FIG. 19, there is shown an exemplary application library consisting of a plurality of possible applications (e.g., E-money, Loyalty, Credit, Bank Card, Mileage) for installation/deletion onto/from a multi-application IC card. In the illustrated example, two applications (designated by being slightly raised) are installed onto the multi-application IC card, i.e., E-Money and Credit. Similarly, in the left-hand portion of FIG. 19, there is shown an exemplary application library consisting of a plurality of possible applications (e.g., E-money, Loyalty, Credit, Bank Card, Mileage) for installation/deletion onto/from a multi-application wallet. In the illustrated example, two applications (designated by being slightly raised) are installed onto the multi-application wallet, i.e., E-Money and Credit. It should be appreciated that in order to utilize the multi-application wallet to access any specific application installed onto the multi-application IC card, a corresponding application program must be preinstalled onto the multi-application wallet. However, as will become more apparent in the discussion to follow the use of a common program and display data with embodiments of the present invention, allows the construction/use of low cost readers which can access/display display data with respect to a multi-application IC card.

Figure 20:
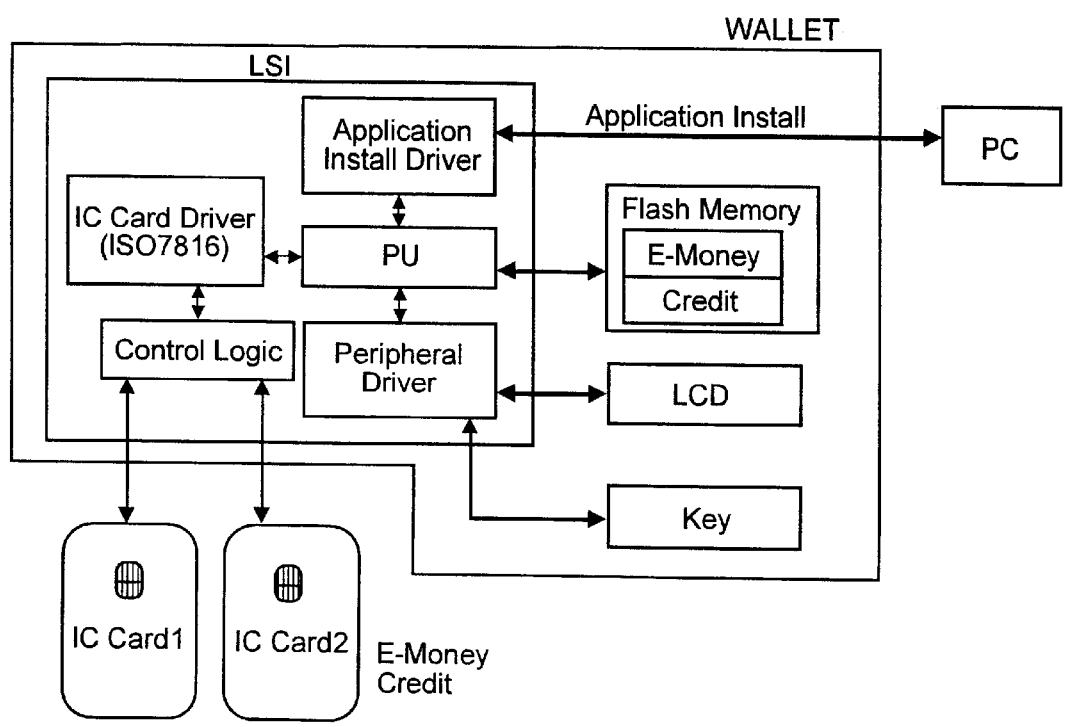
FIG. 20 is a block diagram view showing an exemplary device performing application installation/deletion and application accessing and/or processing with respect to two IC cards according to the invention.

Shown in FIG. 20 is a generic block diagram of the multi-application reader/writer (e.g., wallet), two multi-application IC cards, and an application installation apparatus (e.g., personal computer (PC)), and discussion now turns to explanation of the same. More particularly, the multi-application wallet is constructed of-a large scale integrated (LSI) circuit, a readable/writable memory (e.g., flash memory), a display indicator (e.g., an LCD), and a predetermined number of (e.g., 10) keys. The LSI circuit is illustrated as containing a processing unit (PU), and IC card driver (e.g., in conformance with the International Standardization Organization/International Electrotechnical Commission (ISO/IEC) 7816 International Standard), control logic (for interfacing with the multi-application IC cards), a peripheral driver (for interfacing with the display indicator and key(s)), and an application install driver for interfacing with the application installation apparatus. To install an application to either the multi-application wallet or to either (or both) of the multi-application IC cards, first the application installation apparatus must build an application library through any suitable means (e.g., by obtaining applications by mail, purchase, downloading from the Internet, etc.). Next a communication path (e.g., cable, modem connection, optical link, radio frequency link, etc.) is established between the multi-application wallet and the application installation apparatus. A desired application is then downloaded from the application installation apparatus into any ones of the multi-application wallet and the two multi-application IC cards. While the exemplary FIG. 20 illustrates the multi-application IC cards being application loaded through the multi-application wallet, the multi-application IC cards can just as easily be loaded directly by the application installation apparatus. The exemplary FIG. 20 is consistent with the exemplary FIG. 19, in that E-Money and Credit applications have been loaded onto the multi-application wallet (i.e., the wallet's flash memory) and the multi-application IC card.

Discussion now tends toward more specific details of example embodiments of the present invention. More particularly, FIG. 1 is a block diagram of a low-cost IC card information display device embodying the invention. The display device is structured so as to easily and conveniently display information about a plurality of applications stored in an IC card, i.e., without the excessive processing and time delay associated with separately utilizing each differing application program for accessing each differing application data, and without requiring a user to perform tedious operations. In FIG. 1, reference numeral 1 stands for a multi-application IC card reader display device; 2 for an indicator (e.g., LCD) arrangement; 3 for a display device processing unit (e.g., arithmetic processing unit); 4 for a key arrangement (e.g., having one or two keys); 5 for an IC card reader; 6 for a multi-application IC card; 7 for a connector for connecting with the display device; 8 for an IC card processing unit (e.g., arithmetic processing unit); 9 for an ID number memory area; 10 for an amount information memory area; 11 for a first point information memory area; and, 12 for a second point information memory area. Further included with the FIG. 1 exemplary low-cost reader embodiment of the invention are a IC card reader installed memory (e.g., low-cost ROM) 50 which may contain a common program 70, and also, an IC card installed display data memory area 60.

The FIG. 1 embodiment is a low-cost arrangement in a number of respects. More particularly, the FIG. 1 IC card reader utilizes a common program 70 for accessing display data for multi-applications on the IC card, i.e., the IC card reader does not have and cannot be loaded with a plurality of differing application programs. Accordingly, a low-cost ROM can be used within the reader (instead of more expensive flash memory). Further, the IC card reader 1 need not be fitted with a cable or cable connector for loading/unloading multi-application programs.

Figures 2, 3:
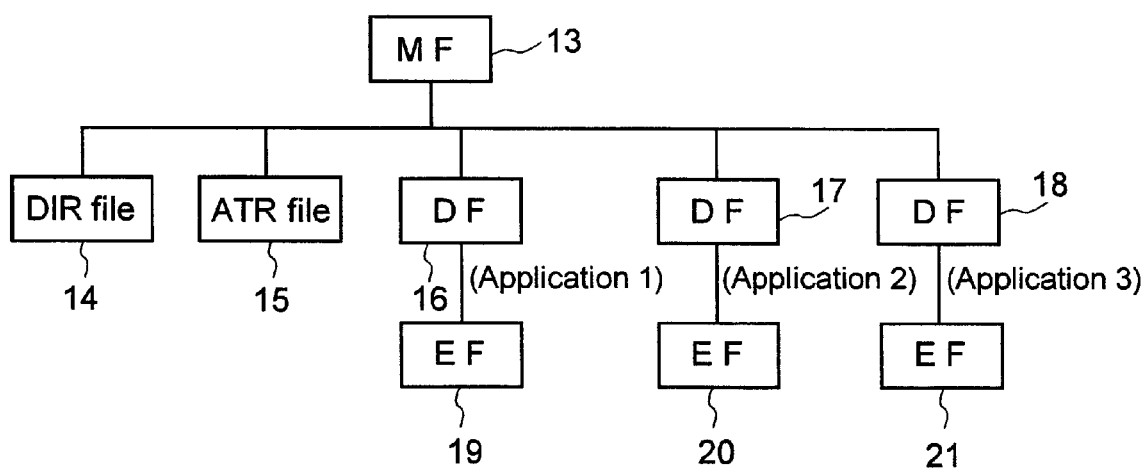
FIG. 2 is a schematic view showing a typical file structure in an IC card according to the invention.
FIG. 3 is a table indicating a typical structure of a directory (DIR) file in the IC card.

A typical data structure in a multi-application IC card for use with the display device is described below with reference to FIGS. 2 and 3. Such IC card is constructed/arranged in conformance with the International Standardization Organization/International Electrotechnical Commission (ISO/IEC) 7816 International Standard, and includes five types of files: master file (MF) 13, directory file (DIR file) 14, answer-to-reset file (ATR file) 15, dedicated files (DF) 16–18 pertaining to separate applications, and elementary files (EF) 19–21 likewise pertaining to separate applications. When powered and fed with a clock and a reset signal, the IC card is activated to permit the use of the various applications stored therein. Immediately after power-up of the IC card, a master file (MF) 13 shown in FIG. 2 is selected. When activated, the IC card returns (in accordance with ISO/IEC 7816) answer-to-reset (ATR) information (i.e., indicative of operating characteristics of the card) to the display device. Any data that have overflowed the ATR which is limited in capacity are placed into an ATR file 15 indicated in FIG. 2.

Summary information about the applications stored in the IC card is contained in a DIR file 14, each application being matched with a record number as shown in FIG. 3. The full applications outlined by the DIR file 14 are actually stored in DF files 16 through 18 in FIG. 2. Relatedly, corresponding data for these applications may be retained in EF files 19 through 21 in FIG. 2.

When selecting an application to be displayed on the display device, a user first selects the DIR file using a Select File command defined under ISO/IEC 7816. Control is passed from the MF (master file) 13 to the DIR file 14 within the IC card. The user looks up the applications stored in the IC card by viewing summary (or index) information from within the DIR file using a Read DIR Record command (also defined under ISO/IEC 7816). The applications may include balance information controller for controlling balance information inside the IC card. When a desired application is found, the user transfers control to that application file (DF) by setting the corresponding application ID (called AID) in the Select File command. This activates the application program which causes application information to appear on the display device.

In FIG. 1, the IC card 6 may include identification (ID) number area 9, amount information memory area 10, first point information memory area 11, and second point information memory area 12, all of which may be at least partially encrypted for security (as represented by the dashed enclosure in FIG. 1) from theft and/or tampering. It is assumed herein for purposes of this discussion that an application 1 (FIGS. 2 and 3) provided in DF 16 controls electronic money (E-Money) operations, and that the FIG. 1 amount information memory area 10 or FIG. 2 EF 19 accommodates electronic money information. Similarly, it is assumed that an application 2 (FIGS. 2 and 3) provided in DF 17 controls premium point operations issued by a department store for use of products/services thereof, and that the FIG. 1 first point information memory area 11 or FIG. 2 EF 20 accommodates premium point information. As another example, mileage point information issued by an airline company for customers utilizing its airline service is stored in the second point information memory area 12. An application 3 (FIGS. 2 and 3) controls the mileage point operations, while the FIG. 1 second point information memory area 12 or FIG. 2 EF 21 accommodates milage point information.

The ID number memory area 9 in FIG. 1 is an area in which to store an ID number specific to the IC card in question. Each application may utilize the ID number stored in the card and/or ID keyed input from a user for authenticating the IC card and or user's authorization to use the card.

Discussion now turns to some of the important features of the present invention. More particularly, suppose that in the setup of FIG. 1, the user wishes to have application information displayed on the display device, with respect to one or more applications. In that case, the processing unit 3 is instructed, for example, to procure display data (i.e., character, numeric, etc. data) representing electronic money information and point information sent from the IC card 6 via the card reader-writer 5 and connector 7. There are several disadvantages with obtaining such display data from the secured (i.e., encrypted) areas of the amount information memory area 10 or EF 19, first point information memory area 11 or EF 20 and second point information memory area 12 or EF 21.

First, each of the differing secured (i.e., encrypted) amount information memory area 10 or EF 19, first point information memory area 11 or EF 20, second point information memory area 12 or EF 21 would have to be separately accessed and processed using a corresponding different application program in order to decrypt and gather information with respect to all the applications. This is a processing intensive operation which can result in a significant time delay before the finally processed information can be displayed.

Further, since the IC card 6 is installed into an IC card reader display device 1 which has not been preloaded with supportive application programs corresponding to the applications being stored within the IC card 6, then information within secured FIG. 1 areas 10–12 and FIG. 2 areas 19–21 with respect any application within the IC card 6 which does not have a corresponding supportive application program within the display device 1, cannot be accessed.

In order to obviate such disadvantages, and to provide a quick and convenient arrangement to procure display information from the IC card, the IC card system of the present invention includes the common program 70 within the IC card reader (or reader/writer) display device 1, and the display data memory area 60 within the IC card 6. More particularly, the display data memory area 60 contains copies, translations or versions of appropriate predetermined (i.e., select) data from secured (i.e., encrypted) areas of at least one of the amount information memory area 10 or EF 19, first point information memory area 11 or EF 20 and second point information memory area 12 or EF 21. Further, such appropriate predetermined data may be written in an unencrypted form (e.g., ASCII text), which can be easily accessed with a common program 70 which can be universally installed in all types of display devices, point-of-sale terminals (POSs), vending machines, banking machines, premium point machines, etc. Accordingly, when an IC card 6 having the display data memory area 60 of the present invention is inserted into a common program equipped apparatus, such apparatus can quickly and easily access the display data within the display data memory area 70, and display such data onto the indicator 2.

Further, the present invention is advantageous in that, if the IC card 6 is installed into a display device which has not been preloaded with supportive application programs corresponding to the applications being stored within the IC card 6, then at least minimal information, i.e., display data, with respect any application within the IC card 6 can be accessed and displayed. Such situation might occur where a user/owner of an IC card remembers to bring his/her IC card, but forgets to bring his/her personal reader/writer display device (loaded with corresponding application programs). Accordingly, an IC card user/owner can make informed personal decisions even in the absence of his/her personal multi-application display device.

As a further advantage, integrity of the IC card system is ensured because, although the common display data within the display data memory area can be easily accessed using the common program, master application data (having priority over the common display data) is secured (e.g., encrypted, passworded, etc.) and stored within secured areas of the amount information memory area 10 or EF 19, first point information memory area 11 or EF 20, and second point information memory area 12 or EF 21. Only this secured master application data (and not the common display data) is entrusted in conducting the secure transactions of the IC card system. Further, cross-checking (at the time of each transaction) of coincidence between the common display data and the secured master application data can be advantageously used as a possible indication of a security breach and/or tampering involved with respect to the IC card 6.

Once display data is obtained, the processed data can be displayed by the indicator 2. Further, in viewing what is displayed on the indicator 2, the user can operate keys 4 to select and review information about a desired application. One way of displaying information about a given application stored in the IC card will now be described with reference to FIG. 4, wherein the display device is exemplarily illustrated having two keys, i.e., key 1 and key 2.

When the user inserts his or her IC card 6 into the display device 1 and as "initialization" and use of the common program occurs, the common display data is obtained from the display data memory area 60, and then display data with respect to an application 1 registered to a record number 1 in the DIR file is selected first. Because the application 1 is associated with electronic money, the indicator shows that the contents of display are electronic money information "E-MONEY". The stored balance information is next shown amounting illustratively to "1,000", and then the type of currency is shown, for example, as Japanese yen "JPY". Electronic money information display screens are switched successively between (i.e., sequentially looped through) the "E-MONEY", "1000" and "JPY" screens with pressing of a key 1 on the display device.

Pushing a key 2 on the display device selects display data with respect to a next application, e.g., the application 2 registered to a record number 2 in the DIR file. Because the application 2 is associated with point information offered by a department store a first screen illustrates "A-SHOP" (i.e., the store's name), while a second screen of the indicator shows that the contents of display are point information amounting illustratively to "30,000P". In this case, point information display screens are also switched successively by pressing the key 1 on the display device.

Pushing the key 2 at this point on the display device selects display data with respect to yet a next application, e.g., the application 3 registered to a record number 3 in the DIR file. Because the application 3 is associated with mileage point information offered by an airline company, a first screen illustrates "B-FLIGHT" (i.e., the airline company's name), whereas a second screen of the indicator shows that the contents of display are mileage point information amounting illustratively to "22,000M". Here, mileage point information display screens are also switched successively by pushing the key 1 on the display device. Each of the applications is identified by the corresponding record number in the DIR file in the leftmost position on the display screen.

Figure 5:
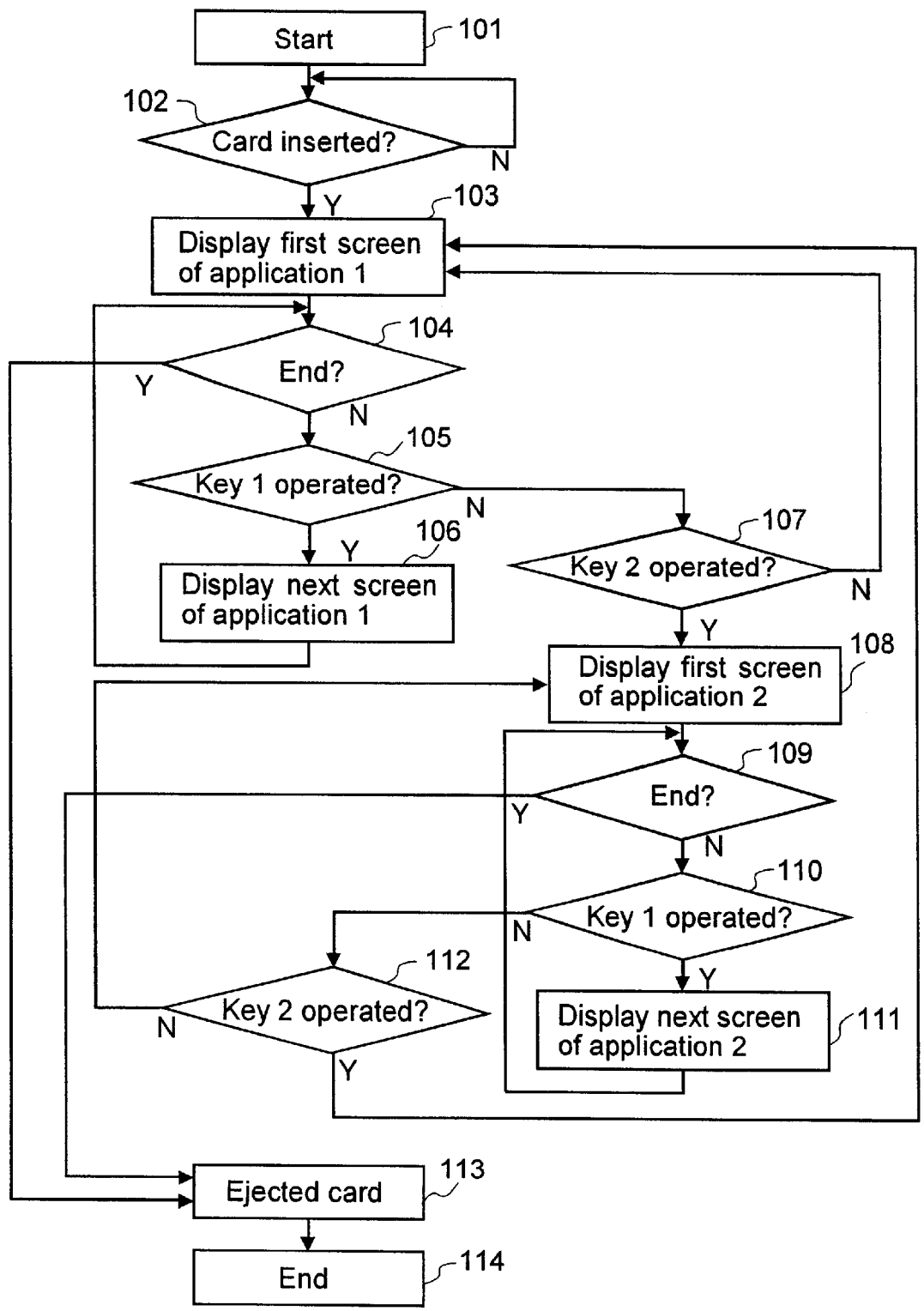
FIG. 5 is a flowchart of steps constituting a typical flow of operations performed by the IC card information display device of the invention.

FIG. 5 is a flowchart of exemplary steps constituting a typical flow of operations for switching display screens by use of the two keys. For the sake of simplicity of illustration and discussion, the FIG. 5 is representative of flowchart steps where there are only two applications loaded (i.e., "E-MONEY" and "A-SHOP"), but such flowchart could easily be expanded to represent more than two applications. Turning now to FIG. 5 discussion, how screens of the applications 1 and 2 are displayed and switched is outlined below. When the steps are started (step 101) and the IC card is inserted into the display device (step 102), a first display data screen of the application 1 appears (step 103). If in a next step, (step 104) a user then indicates an end to the operations, the card is ejected (step 113) and flowchart ended (step 114), and if an end to the operations is not indicated, then operations continue. If the key 1 is pushed (step 105), the next display data screen of the application 1 appears (step 106), and the flowchart loops back to perform steps 104–106 again. As key 1 is pressed through each loop, the screen sequences through three data display screens "E-MONEY", "1000" and "JPY". If in step 105, key 1 is found not to be operated, the flowchart proceeds to step 107.

If in step 107 the key 2 is not pushed, the flowchart returns back to step 103. Alternatively, if in step 107 the key 2 is pushed, the first screen of the application 2 appears (step 108). In this case, the screens of the application 2 are also switched in the above-described manner using the keys 1 and 2. More particularly, if in a next step, (step 109) a user indicates an end to the operations, the card is ejected (step 113) and the flowchart ended (step 114), and alternatively, if an end to the operations is not indicated, then operations continue. If the key 1 is pushed (step 110), the next screen of the application 2 appears (step 111), and the flowchart loops back to perform steps 109–111 again. As key 1 is pressed through each loop, the screen sequences through two screens "A-SHOP", and "30,000P". If in step 110, key 1 is found not to be operated, the flowchart proceeds to step 112. If (step 112) key 2 is not operated, the flowchart returns to step 108, and if operated, the flowchart returns to step 103.

Figure 6:
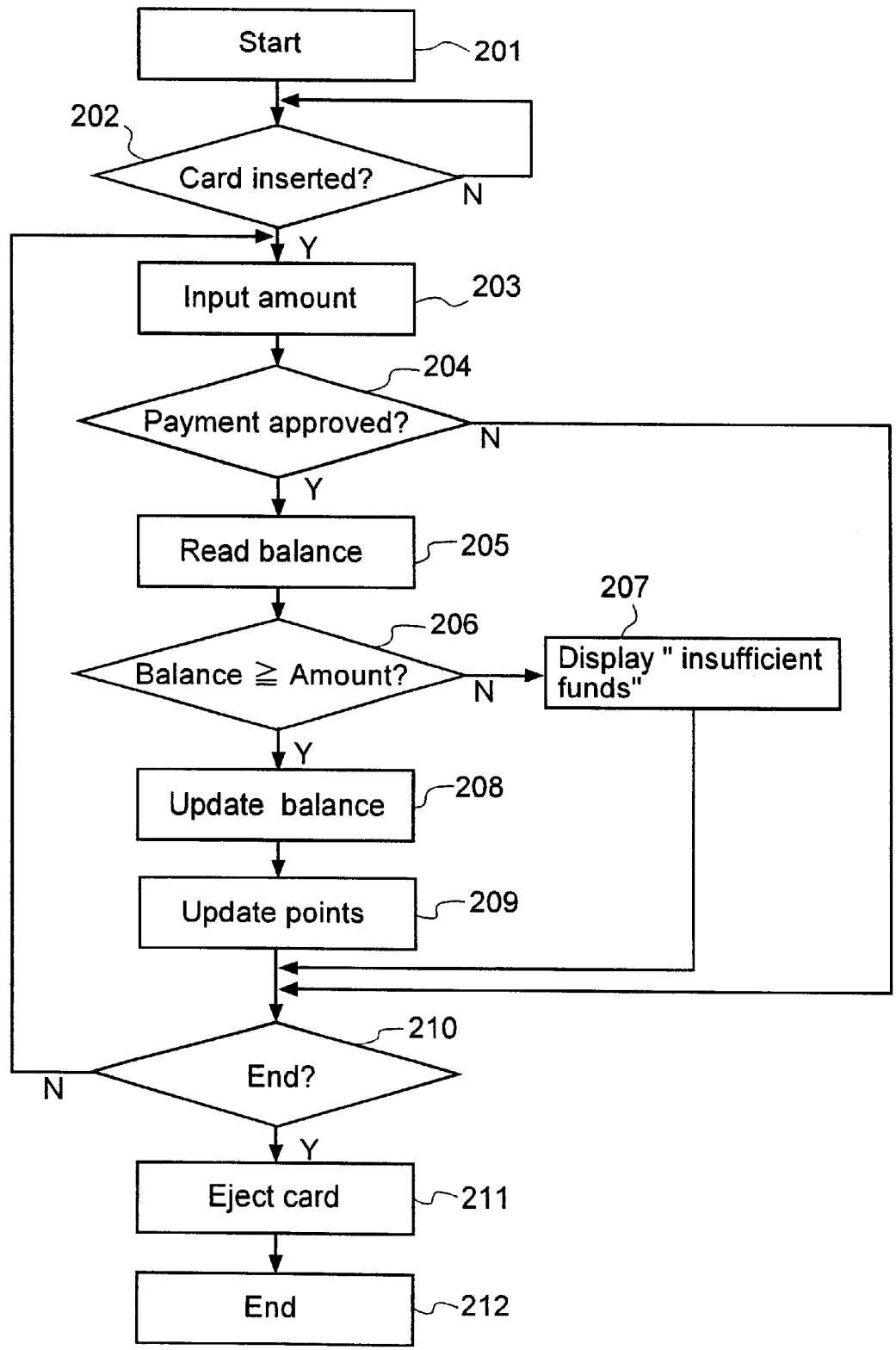
FIG. 6 is a flowchart of steps for updating electronic money information and point information in the IC card of the invention.

Described below with reference to FIG. 6 is a typical flow of steps in which a user makes a payment in electronic money for a purchase and receives premium points from a department store where the user has made the purchase. After starting (step 201), step 202 loops until a user initially inserts his or her IC card into a POS terminal at the store. Once the IC card is inserted, a purchase amount is inputted (step 203). The user then has a chance (through appropriate input) to approve the payment (step 204). If not approved, the flowchart moves to step 210. If approved, the processing unit 8 in the IC card reads (step 205) balance information from the amount information memory area 10 concerning the amount of electronic money available within the card. The processing unit 8 then checks (step 206) to see if a sufficient electronic money balance exists so the amount can be paid. If the current balance is not sufficient, an "Insufficient funds" indication appears (step 207) and this attempted payment processing flows next to step 210. If in a step 210, a user decides not to end processing, processing returns to step 203 (e.g., for another attempt at a purchase for a lower amount). If in step 206 the balance is found to be sufficient to pay the amount in question, an appropriate electronic money amount is transferred to the POS terminal and the balance information in the amount information memory area 10 is updated (step 208). The first point information memory area is also updated (step 209) so that the point information reflecting the amount of the payment is transferred to the user. If in the step 210, the paying process is decided by the user to be terminated, the IC card is ejected from the POS terminal (step 211) and the processing is brought to an end (step 212).

Described below with reference to FIGS. 7 through 9 are typical processes of accessing/storing the display data into the IC card application information for display on the display device, such IC card and IC card display device being constructed/arranged in conformance with the International Standardization Organization/International Electrotechnical Commission (ISO/IEC) 7816 International Standard. It is assumed that display data to be displayed on the display device are stored separately from the electronic money information, point information and the like described above, e.g., as illustrated/described with respect to FIG. 1. Specifically, actual master data such as electronic money information and point information are accessed/stored via secured areas of the amount information memory area 10, the first point information memory area 11 and second point information memory area 12 inside the IC card 6 shown in FIG. 1, as well as in the EF 19 through 21 shown in FIG. 2. In contrast, the display data application information for display purposes is accessed/stored as character data via the display data memory area 60 using the procedure outlined in FIGS. 7 through 9.

More particularly, FIG. 7 shows one way of accessing/storing application information into the DIR file within the IC card. The IC card display device first sends a command (Read DIR Record command) formatted as shown in section (a) of FIG. 7 to the IC card. A field x1 is set for the record number of the application to be read from the DIR file. In turn, the IC card returns an x2-byte-long response data (Read DIR Record response) formatted as shown in section (b) of FIG. 7 to the display device. Included within such response data (see FIG. 7 dash enclosed area) and designated by tags "50" are display data accessible and used by the common program 70 to produce a display output on the display indicator 2. Following the record response, two-byte status information (Status) is output to indicate an end and also indicate whether the response is normal or faulty. All of the command, response data and status are standardized in accordance with ISO/IEC 7816 (in a tag, length, value (TLV) structure), for example: one-byte information for data identification (Tag), one-byte information for designating the record data length (Length), and record data (Records) indicated by the Length component. Attention is directed to relevant ISO/IEC 7816 publications for further teachings/understanding regarding formatting, timing, etc. Accordingly, it can be seen that appropriate common display data can be stored and accessed with respect to the muli-application IC card and multi-application IC card display device, thus facilitating the present invention's use of a common program and common display data for conveniently and quickly accessing/displaying relevant application display data.

The following provides some further guidance. More particularly, the response data regarding each application are headed by a tag "61" followed by length information indicating the response data length (x2 bytes) minus two bytes. The length information is followed by a tag "4F" denoting an application ID (AID). More detailed information about the application in question may be stored using a TLV structure. Thereafter, application information such as electronic money information and point information is accessed/stored with respect to the DIR file. It is assumed here that a TLV structure headed by a tag "50" is used to accommodate application information such as Data 1 and Data 2. In such a case, application data are stored in ASCII code so that ASCII-coded character information can be used unmodified to effect display on the display device, whereby display data for diverse kinds of applications may be displayed in a standardized manner.

Where a plurality of data on a given application need to be displayed (e.g., application name, amount information, currency type), each data item is headed by a tag "50" in a TLV structure and stored in the DIR file. This arrangement permits successive display of screens. In the case of the display example shown in FIG. 4, an indication "E-MONEY" represents data about electronic money as Data 1; "1,000" denotes the amount as Data 2; and "JPY" stands for the currency type as Data 3, all stored in the form of ASCII character data. In the example above, the application information is stored in the DIR file. Alternatively, display data about the applications may be stored in the ATR file 14 in FIG. 2. In this case, data acquisition is effected using a Read Binary command and a response defined under ISO/IEC 7816.

Described below with reference to FIG. 8 is an example in which application information is accessed/stored into response data for the Select File command that is used to select an application. Each of the applications may includes balance information controller for controlling balance information in the IC card. In this example, so-called File Control Information (FCI) standardized under ISO/IEC 7816 is used to store the application information. The command and response data are also standardized under ISO/IEC 7816. When x1-byte-long AID is sent to the IC card, x2-byte-long FCI data and status Information (Status) are returned from the IC card to the display device as response data (Select File response).

The FCI data have a TLV structure. The top tag is "6F" and the tag of the AID is "84." ASCII-coded information about a given application is headed illustratively by a tag "50", i.e., illustrated within the FIG. 8 dash enclosed area. Screens of the application information are displayed successively on the display device.

Described next with reference to FIG. 9 is an example in which application information is accessed/stored using particular data that are different from the command and response data standardized under ISO/IEC 7816. In this case, the user first selects a desired application by employing a Select File command. Then the particular data are transmitted to the IC card using a Get File Data command shown in the (a) section of FIG. 9. This allows the display device to receive from the IC card the application data desired for display by the user. The structure of the command and response is assumed to comply with ISO/IEC 7816. As shown in FIG. 9, x2-byte-long response data (Get File Data response) are transmitted to the display device.

The data about each application have a TLV structure is shown in section (b) of FIG. 9. For example, the top tag is "61" and the tag of the AID is "4F." ASCII-coded information about a given application is headed illustratively by a tag "50", as illustrated within the FIG. 9 dash-enclosed area. Screens of the application information are displayed successively on the display device.

Some typical ways of accessing/storing, with respect to the IC card, application display data information for display on the display device have been described above. The stored information all constitute display data to be displayed on the display device. As described, actual master data such as electronic money information and point information are stored in secured (e.g., encrypted) areas of the amount information memory area 10, the first point information memory area 11 and second point information memory area 12 inside the IC card 6 shown in FIG. 1, as well as in the EF 19 through 21 shown in FIG. 2. Whereas display data is stored in the place that can be easily read by the display device, actual master (i.e., secure) data that has a value as an amount of money and a point can be read only using the program corresponding to each application, and can be changed and rewritten only by authorized: devices (e.g., a POS terminal). Accordingly, there is provided an arrangement for protecting actual master data which is very important, while display data can be easily indicated. In such cases, master data may be encrypted and/or passworded when stored. In addition, although being described thus far as not being encrypted, the common display data may also be encrypted and/or passworded where appropriate.

How to update display data information about a given application for display on the display device will now be described. When a user carries out a commercial transaction using electronic money and receives point information from the store where the purchase has been made, the display data to be displayed must be updated concurrently (i.e., the new/rewritten master data and the stored display data must be made to coincide by the end of such transaction). The processing unit 8 in the IC card 6 is thus controlled to update simultaneously the display data for display as well as the contents of the amount information memory area and of the first and second point information memory areas. In such a case, the display data are updated not from outside the IC card, but within the card through automatic processing by the processing unit 8 in the IC card. The display data are thus available as read-only data that cannot be tampered with for falsification.

Examples shown in FIGS. 10 through 12 involve having the display data updated by transmitting to the IC card particular commands from a POS terminal or the like where commercial transactions take place. In these examples, commands are sent to the IC card to update the display data following transactions of electronic money information and point information.

Referring to FIG. 10, the command and response data for updating ASCII-coded character data stored in the DIR file will now be described. The structure of the command and response data is assumed to comply with ISO 7816. The record number of the application to be updated is stored in x3 bytes, and x5-byte-long command data (Change DIR Record command) are transferred to the IC card to update the display data.

The command data structure is headed illustratively by a tag "61." The AID is stored with a tag "4F," followed by the old data to be updated which are stored with a tag "50." The old data are in turn followed by those new data to replace the old which are stored with a tag "55." When the command data are transmitted to the IC card, two bytes of the updated results are returned as status information (Status).

There are two ways to transmit old and new data. That is, either limited old and new data are transmitted to replace only target (i.e., specific) data, or the old and new data are transmitted to replace all data.

Described below with reference to FIG. 11 is how to update ASCII-coded character data stored as File Control Information (FCI) data in the response data for the Select File command. The structure of the command and response data is also assumed to comply with ISO 7816. Command data (Change FCI Record command) x5 bytes long are transmitted to the IC card to update the display data therein.

The command data structure is headed illustratively by a tag "6F." The application identification AID is stored with a tag "84," followed by the old data to be updated which are stored with a tag "50." The old data are in turn followed by those new data to replace the old which are stored with a tag "55." When the command data are transmitted to the IC card, two bytes of the updated results are returned as status information (Status).

Described next with reference to FIG. 12 is how to update display data stored in the response data for a command not defined under ISO 7816 (e.g., Get File Data command). In this case, it is also assumed that the structure of the command and response data complies with ISO 7816. Command data (Change File Data command) x5 bytes long are transmitted to the IC card to update the display data therein.

The command data structure is headed illustratively by a tag "61." The AID is stored with a tag "4F," followed by the old data to be updated which are stored with a tag "50." The old data are in turn followed by those new data to replace the old which are stored with a tag "55." When the command data are transmitted to the IC card, two bytes of the updated results are returned as status information (Status).

New data have been shown replacing old data in the examples above. The command data to be transmitted for an update operation may consist of new data alone in order to keep replacing the old data. Display data may be added if desired, having a TLV structure headed illustratively by a tag "55." Where the update command is used, it is possible to make arrangements so that display data can be updated only if the user enters a correct password number. Such arrangements if implemented will prevent illegal modification of display data.

Whereas display data stored in the IC data may be updated in the manner described above, it is common practice to reinforce security by updating the display data not with a command sent from the POS terminal or the like to the IC card but with the display data updated by the processing unit 8 in the IC card. That is, the display data should preferably be handled as read-only data outside of the card, and any rewriting of display data should be effected by the processor 8 within the IC card.

Figure 18:
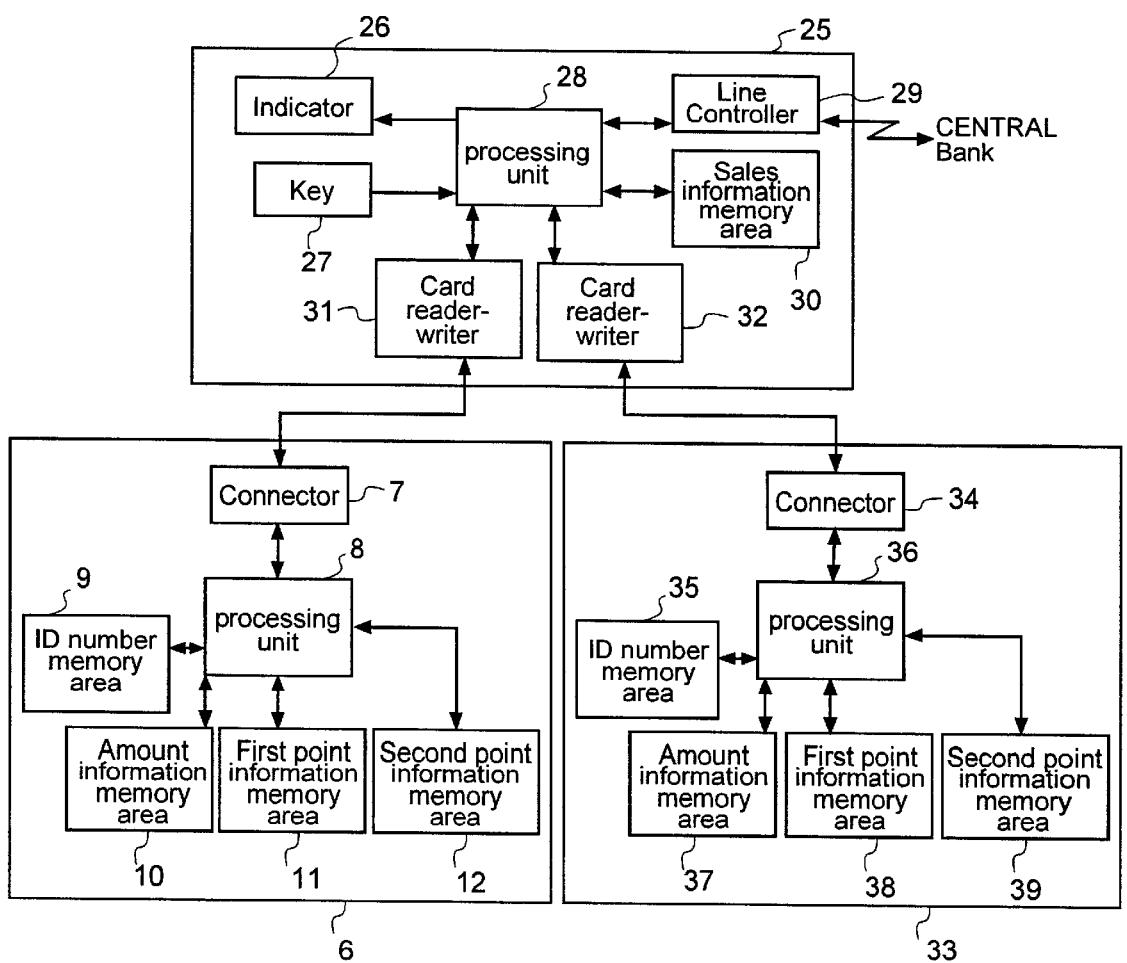
FIG. 18 is a block diagram view showing an exemplary device performing application accessing and/or processing with respect to two IC cards according to the invention.

FIG. 18 shows the way of updating information data inside the IC card with an information updating (reader/writer) device such as a point-of-sale (POS) terminal. The POS terminal is used by retailers to effect commercial transactions. Now an exemplary transaction of electronic money information and point information between customer A's IC card 6 and shop B's IC card 33 through the POS terminal 25. will be described.

Customer A goes to the shop with IC card 6 shown in FIG. 18. It has electronic money information in amount information memory area 10 and point information of shop B in first point information memory area 11. Shop B also has IC card 33 similar to customer A's IC card 6. The IC card 33 has electronic information for electronic money (E-Money) in amount information memory area 37 and point information which will be distributed to customers in first point information memory area 38. The processing units 8, 36 are utilized in completing the transaction, and ID's contained within the ID number memory areas 9, 35 may be used before actual conducting of the transaction to verify authentication of the respective cards and/or authority of the card users. The second point information memory areas 12, 39 are not used in this discussed example.

When customer A purchase a merchandise, customer A connects connector 7 inside the IC card 6 to card reader-writer 31 inside the POS terminal 25. Shop B also connects connector 34 inside the IC card 33 to card reader-writer 32 inside the POS terminal. Next shop B inputs the amount of the merchandise by key 27, and instructs the POS terminal 25 to transact the sale. Indicator 26 shows instruction to and response from the POS terminal. The instruction causes processing unit 28 inside the POS terminal 25 to control transmission of electronic money information from amount information memory area 10 inside the IC card 6 to amount information memory area 37 inside the IC card 33. After that, point information corresponding to the amount of the transaction is transmitted from first point information memory area 38 inside the IC card 33 to first point information memory area 11 inside the IC card 6. The transaction completes.

It is possible to record the proceeds of this transaction in sales information memory area 30 inside the POS terminal. Further, it is possible to transmit electronic information and point information to an external bank center using line controller 29.

As part of the transaction, the display data to be displayed on a display device is updated by processing unit inside each IC card on the basis of updated master data such as electronic money information and point information. However, due to device conflicts, etc., in practice, the display data and the actual master data cannot be updated simultaneously. According, the display data may be updated after updating the actual master (i.e., secured) data. In a case where the IC card is extracted by mistake or with malice before the end of the updating process, it is possible that the master data will be updated, while the display data has not been updated yet and the display data present before the transaction exists. In order to prevent such situation, an IC card reader/writer (e.g., a POS terminal) can be constructed/arranged to have a protective function wherein the transaction cannot be ended and/or the IC cards cannot be removed, until both the display data and master data have been updated and coincide. The IC card reader/writer can then automatically eject the card and/or display an appropriate message that the transaction is complete and/or successful. As further security, the IC card reader/writer can be constructed/arranged to prohibit a commercial transaction to be conducted with respect to any IC card where the display data and master data are found not to coincide.

Figure 17:
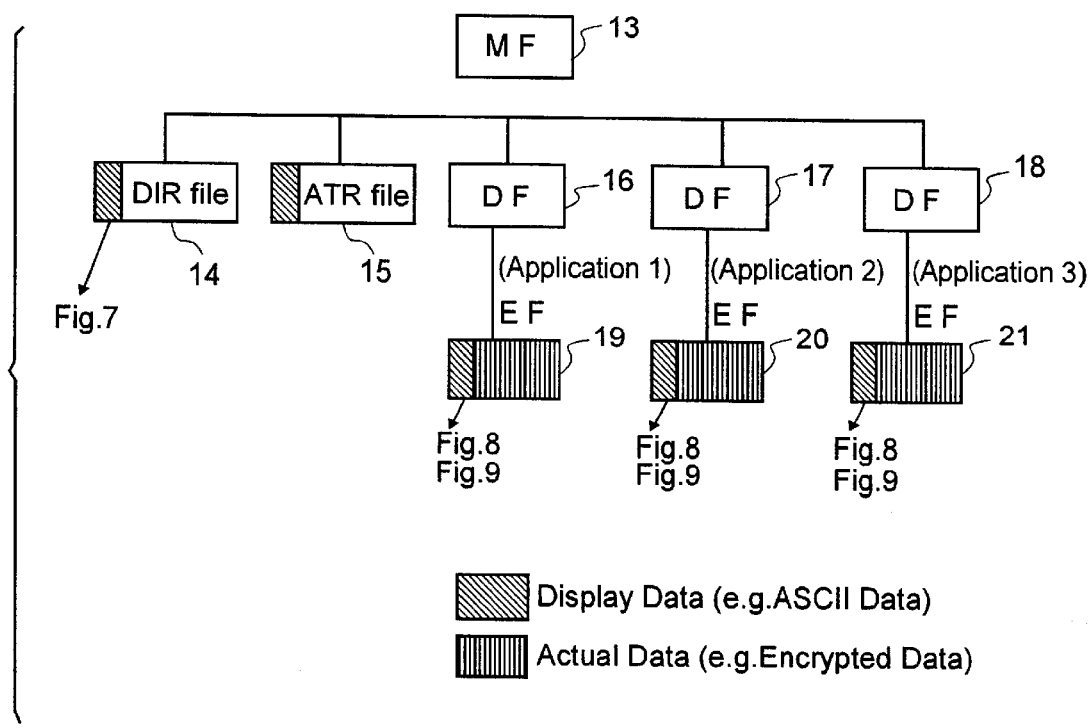
FIG. 17 is a schematic view showing another typical file structure in an IC card according to the invention.

FIG. 17 is an exemplary illustration showing that the display data used with the present invention can be stored in any of a variety of locations within the IC card. More particularly, the display data (show with appropriate highlighting) can be stored (i.e., as part of) any one or more of the DIR file 14, ATR file 15, and EF files 19–21. The operations of alternative approaches of how the display data are illustratively acquired from some of the differing areas of the IC card will now be described with reference to the flowchart of FIG. 13.

After startup (step 301) and when the user inserts his or her IC card into the display device (step 302), the IC card is powered and fed with a clock and a reset signal for activation (step 303). Then the IC card transmits an ATR signal to the display device (step 304). The display device initially sends a Select File command to the IC card to select the DIR file (step 305).

Figure 13:
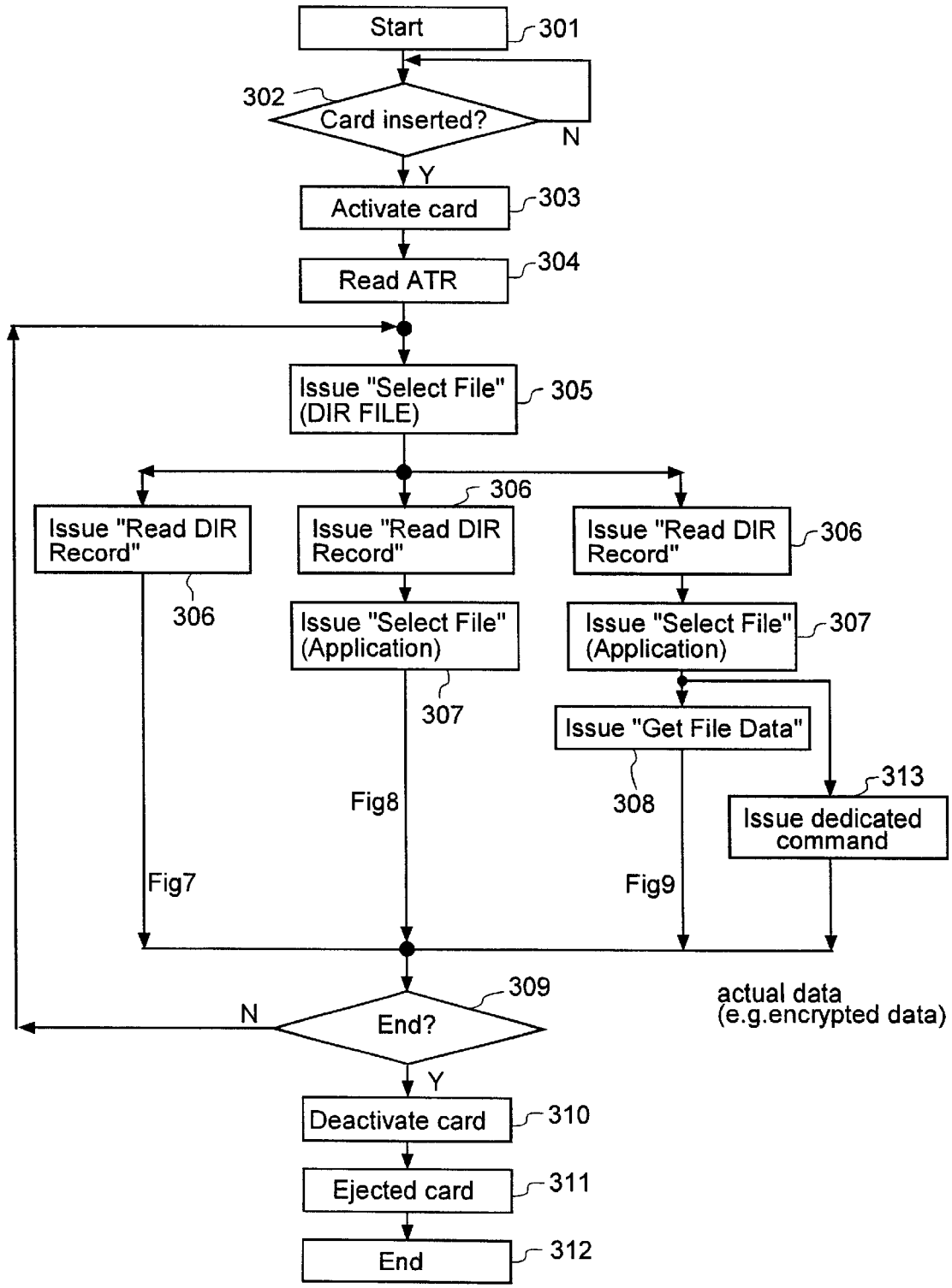
FIG. 13 is a flowchart of steps in which the inventive IC card information display device operates to acquire display data.

Referring to the left (i.e., FIG. 7) flow-down branch of FIG. 13, the display device then transmits a Read DIR Record command to the IC card (step 306), to retrieve application information from the DIR file. If display data regarding a given application are to be accessed/stored with respect to the DIR file 14 as shown in FIGS. 7 and 17, the response data for the Read DIR Record command are read so as to obtain and display desired display data. In such a case, steps 307 and 308 are not necessary. The approach or accessing/storing display data with respect to the DIR file 14 is advantageous in terms of simplicity and minimization of commands issued before display data is obtained.

Referring to the middle (i.e., FIG. 8) flow-down branch of FIG. 13, another approach would be to access/store display data with respect to another file, i.e., in a case where the display data is not accessed/stored with respect to the DIR file 14. More particularly, after the Read DIR Record command 306, a Select File command and the ID of the desired application (AID) are both transmitted (step 307) to the IC card, whereby the desired file utilized for accessing/storing the display data is selected. More particularly, if display data about a given application are accessed/stored in the response data for the Select File command as indicated in FIG. 8, the response data (FCI data) for the Select File command are read so as to display desired application data. In this case, step 308 is not needed. Display data is accessed/stored with respect to the Select File operation as shown in FIG. 8. Thereafter, the obtained display data can be displayed.

Referring to the right (i.e., FIG. 9) flow-down branch of FIG. 13, another approach would be to access/store display data with respect to a Get File operation, i.e., again in a case where the display data is not accessed/stored with respect to the DIR file 14. In such branch, first the Read DIR Record operation (step 306) is issued, and then a desired application is first selected utilizing the Select File operation (step 307). Then a Get File Data command is transmitted to the IC card (step 308), whereby the response data are acquired and display data are read. Alternatively, if a dedicated command of each application is sent to the IC card, dedicated data of the application is read (step 313). In this case each data is encrypted, and it is possible to read actual data such as electronic money information and point information. Further, the dedicated command of each application can not only read, but can also update the actual data.

If in a step 309, it is decided that the display operations should not be ended and the next data are desired to be displayed, the flow returns to step 305 and the steps above are repeated. If after inquiry in a step 309, the display operation is to be terminated at this point, the supply of power, clock and/or reset signals to the IC card are stopped so as to deactivate the card (step 310). Then the IC card is ejected from the display device (step 311), and the processing is brought to an end (step 312).

Figure 4:
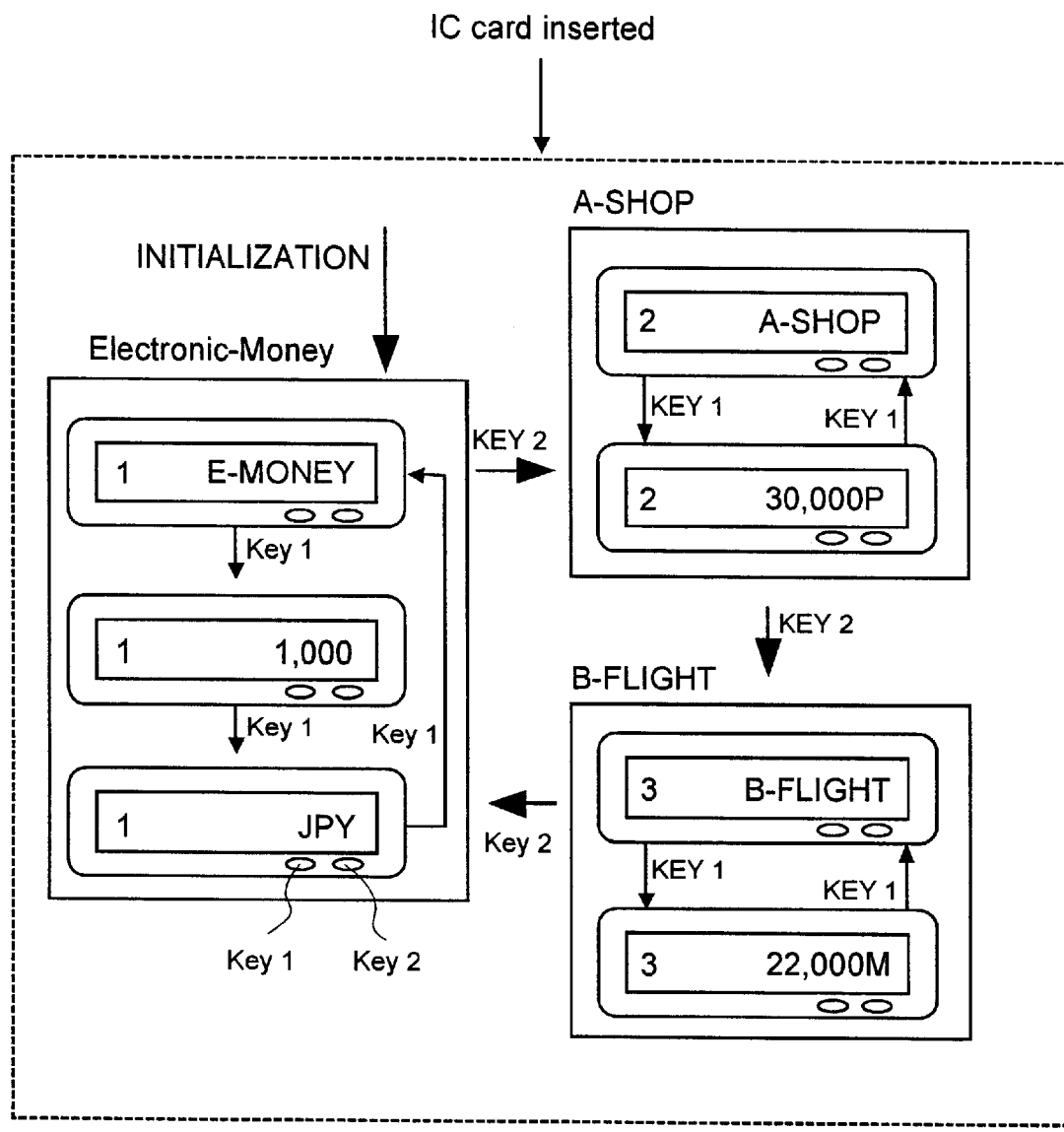
FIG. 4 is a schematic view depicting a typical display scrolling of the IC card information display device according to the invention.
Figure 14:
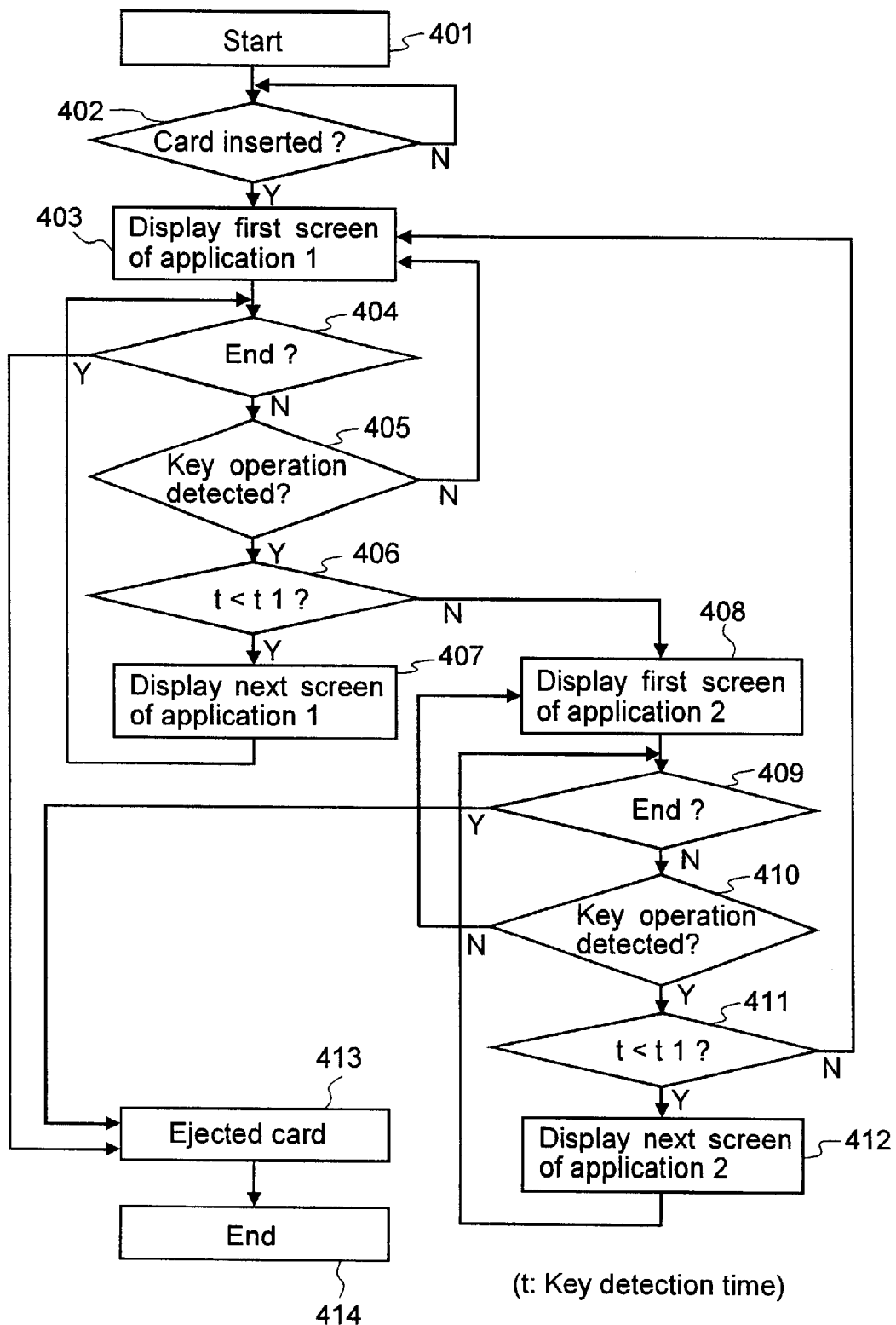
FIG. 14 is a flowchart of steps constituting another typical flow of operations performed by the inventive IC card information display device.

How the keys on the display device are operated will now be described with reference to FIG. 14. In the setup of FIG. 4, the two keys 1 and 2 are pushed to switch display screens. In contrast, FIG. 14 shows steps wherein a single key 1 and differing length key depressions are used to switch the screens. More particularly, after a start 401, and a looping of a step 402 until a card is inserted, a first screen of display data for a first application is displayed. If in a step 404 it is decided that a display should end, the flow progresses to a step 413 where the card is ejected and the display operation ended (step 414). Alternatively, if in a step 404 it is decided that a display should not end, occurrence of a key operation is detected (step 405). If no occurrence of a key operation is detected in step 405, flow returns back to step 403. Alternatively, if occurrence of a key operation is detected in 405, the length of time "t" of the key depression is compared (step 406) to see whether it is less than a predetermined value "t1" (e.g., 1 second). If less than the predetermined value, an next screen of the present application is displayed (step 407), and then flow returns to the step 404.

If "t" is not less than "t1" (i.e., is a long length key depression), such is an indication that display data with respect to a differing (i.e., next) application is commanded, and a first screen of a next application is displayed (step 408). If in a step 409 it is decided that a display should end, the flow progresses to a step 413 where the card is ejected and the display operation ended (step 414). Alternatively, if in a step 409 it is decided that a display should not end, occurrence of a key operation is detected (step 410). If no occurrence of a key operation is detected in step 410, flow returns back to step 408. Alternatively, if occurrence of a key operation is detected in 410, the length of time "t" of the key depression is compared (step 411) to see whether it is less than a predetermined value "t1" (e.g., 1 second). If less than the predetermined value, an next screen of the present application is displayed (step 412), and then flow returns to the step 409. If "t" is not less than "t1" (i.e., is a long length key depression), such is an indication that display data with respect to a differing (i.e., next) application is commanded, and a first screen of a next application is displayed, and accordingly, in the FIG. 14 example having only two applications, flow returns to step 408.

Whereas the length of the time period in which a key is pushed is detected for display switchover purposes in the above example, the number of times the key is pushed may instead be counted to effect the display switching. In the latter case, display screens of the same application may be switched illustratively when the key is pushed once, and applications may be switched when the key is pushed at least twice consecutively. Alternatively, switchover controls may be effected in a more detailed manner in keeping with the number of times the key is pressed. Specifically, the next display screen of a currently displayed application may be reached if the key is pushed once; the preceding screen of the same application may be reached if the key is pushed twice; another application may be invoked if the key is pushed three times.

As another alternative, keys may be altogether removed from the display device. That is, the terminal may be controlled in such a manner that switches automatically its display screens at predetermined intervals. Even if the display device has a key, it is possible to make arrangements so that automatic switching may be utilized. More particularly, the IC card display device may be constructed/arranged such that automatic switching is stopped by pushing the key once, and may be resumed again by pushing the key again.

Other ways of using the display data area are outlined below. In the preceding examples, application service names, amount information, currency type and point information is stored in the display data area. Alternatively, the user may at his or her discretion utilize that area as a memo pad. For example, after making a purchase with electronic money, the user may write a memo to the area using an electronic pocketbook terminal. On returning home, the user can look up the memo while making entries into a housekeeping account-book. In such a case, memos can be written to the IC card when the electronic pocketbook terminal transmits to the card the commands shown in FIGS. 10 through 12.

Where the number of times the area is accessed by each of the applications is recorded, it is possible to have the display device display the applications successively in descending order of their access counts. In particular, if data are recorded in the DIR file as shown in FIG. 7, the processing unit 3 of the display device may initially read from the DIR file the access count of each of the applications and then display the applications in descending order of their access counts. In this case, the use status of each of the applications has been recorded in the IC card. This allows the applications to be displayed in descending order of their access counts, even when display devices are changed. Alternatively, such use frequencies of the applications may be stored not in the IC card, but in a memory within the display device.

Most of today's IC card display devices are controlled so that their power is removed a predetermined time period after they were switched off. It is also possible to make arrangements so that the present IC card display device is automatically turned off a predetermined time period following display.

Another way of storing display data into the IC card will now be described with reference to FIG. 15. In the examples above, display data were shown being stored in a TLV structure into a specific file such as the DIR file inside the IC card. Alternatively, as shown in FIG. 15, special character strings such as @NEXT and @END may be used to distinguish display characters. For example, if the command shown in FIG. 7 is used, display data are stored using a format of FIG. 15 into a character string headed by a tag "50" in the response data. In this case, the display data shown in FIG. 15 are set corresponding to record numbers 1 through 3 in the DIR file. This allows displays such as those in FIG. 4 to be carried out on the display device. If the command in FIG. 8 is used, the data in FIG. 15 are placed into the response data when a given application is selected by the Select File command. The character string @NEXT indicates continuation of next display data, and @END denotes the last display data. If the command in FIG. 9 is used, the data in FIG. 15 may likewise be placed into the character string headed by the tag "50." Alternatively, only the data in FIG. 15 may be stored in the response without the use of a tag.

Figure 16:
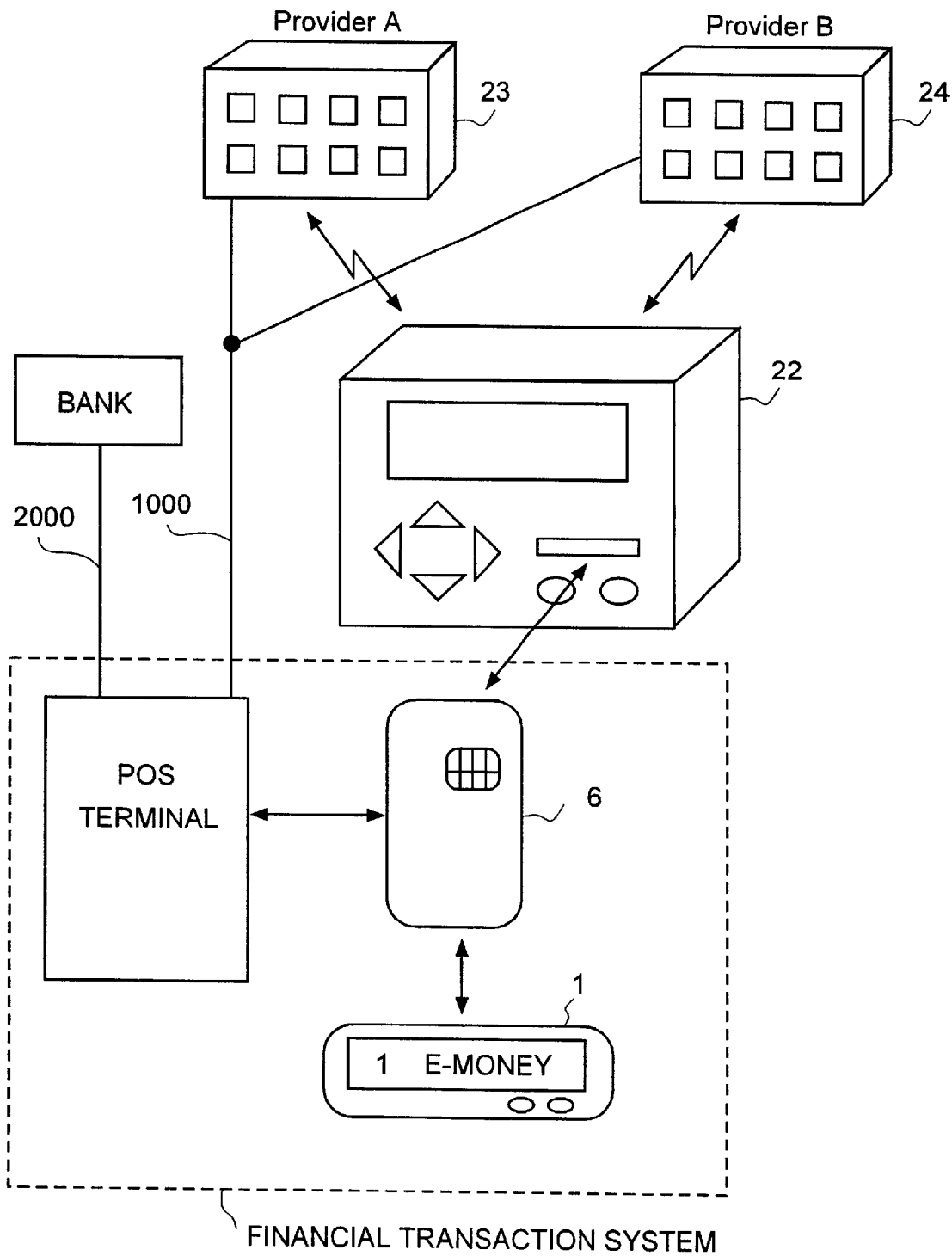
FIG. 16 is a schematic view illustrating how applications are typically written to the inventive IC card, and/or devices interact therewith.

How an application is entered into the IC card will now be described with reference to FIG. 16. When the user wishes to enter a new application into his or her IC card, an IC card application writer 22 shown in FIG. 16 may illustratively be employed. In entering the desired application, the user inserts the IC card into the writer 22 and operates appropriate selection keys. The IC card application writer 22 is connected via any type of communication (indicated generically by the jagged arrows) or like means to application providers 23 and 24. The desired application is downloaded from the suitable provider over such communication arrangement. When the application is written to the IC card, character code data for display are also written to a common area in the IC card in the manner described above. Alternatively, an application may be provided to a POS terminal via communication (e.g., telephone/modem lines 1000), and the application can be loaded into an IC card 6 by the POS terminal. Usually the POS terminal is connected to a bank via communication (e.g., telephone, modem) lines 2000. Alternatively, the user may connect a household computer to a provider over the telephone line to download an application therefrom for entry into the IC card.

Figure 21:
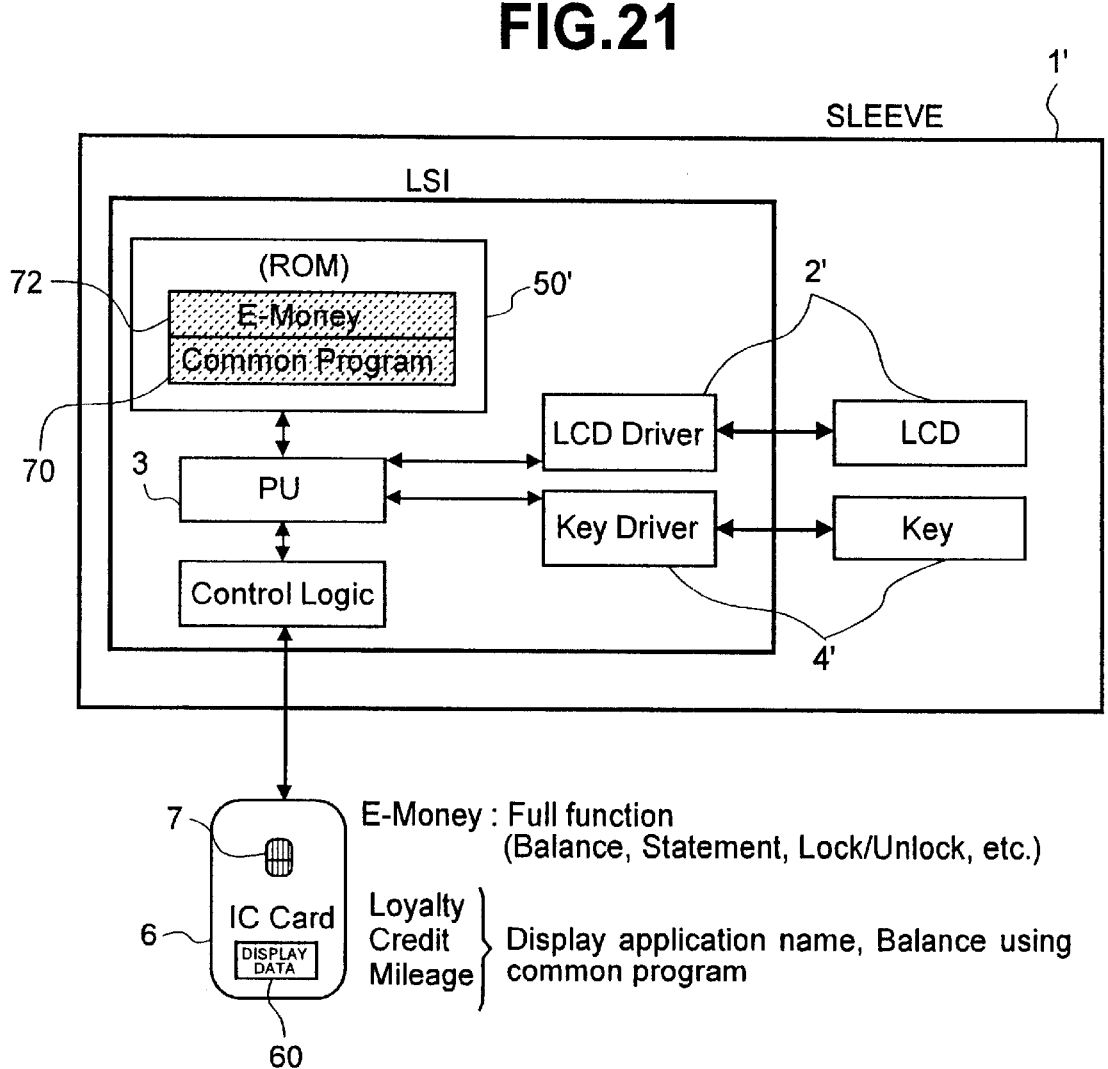
FIG. 21 is a block diagram view showing an exemplary device performing application accessing and/or processing with respect to an IC card according to other applications as well as an electronic money application.

Another example is a FIG. 21 low-cost sleeve embodiment 1' closely similar to the FIG. 1 reader embodiment 1, except that: an LCD-driver/LCD arrangement 2' is illustrated instead of just the indicator 2; a key driver/key arrangement 4' is illustrated instead of just the generic keys 4; and, the ROM 50' further includes an "E-Money" program 72 in addition to the common program 70. Further, in FIG. 21, there are shown the exemplary applications of "Loyalty", "Credit" and "Mileage" loaded with respect to the multi-application IC card. The FIG. 21 arrangement is advantageous over the FIG. 1 embodiment in that the further included E-Money program allows further functions/operations with regard to E-Money. More particularly, the sleeve 1' can display balance data and a statement (i.e., a transaction history). Further, the E-Money information can be locked/unlocked with a password. However, the sleeve cannot update the E-Money information within the IC card 6, and cannot have its E-Money program updated owing to the fact that it is stored within a ROM rather than a rewritable memory. In contrast, the display data memory area 60, may be any readable/writable type of memory, i.e., to accommodate the rewriting of changing balance amount, premium point, etc. display data.

The embodiments discussed with reference to the Figs. have been shown utilizing a contact type IC card that exchanges signals through physical contacts with the IC card display device. Alternatively, the contact type IC card may be replaced by a noncontact type IC card in which communications are conducted between the IC card and IC card display device thought non-contact type communications, e.g., radio frequency communications, optical communications, etc.

In addition to storing applications/data with respect to commercial transactions, the multi-application IC card and IC card devices can likewise be used with respect to non-commercial applications/data. Non-exhaustive examples include health insurance information, a library card account, driver's license, etc.

As described and according to the invention, a plurality of kinds of application information such as electronic money information and premium point information are stored together in a single IC card. A user may get necessary application information selected from the card and displayed on a display device by operating suitable keys. When display data are stored in a standardized format in a predetermined area inside the IC card, a desired kind of application information may be displayed by a simple procedure on a balance indicator or like display devices with limited display panel or key functions. In particular, if application information is held in the DIR file, necessary information is obtained without recourse to a Select File command for selecting the application. This further simplifies the procedure for acquiring display data from the IC card.

Because the display data are stored in the standardized format inside the IC card, the program for reading display data from the IC card may be shared between different applications. This means that there is no need to modify the control program in the display device when a new application is added to the IC card.

This concludes the description of the preferred embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art, especially as knowledge and technology develops.

What is claimed is:

1. An IC card having a non-volatile memory, comprising:
    a protected memory area in said non-volatile memory, to store application information data for at least one application program and to protect the application information data from unauthorized change; and an unprotected memory area in said non-volatile memory, to store accessible display information data which are accessible by a generic access application program of an electronic device interfaceable with the IC card, said display information data representing an accessible version of select ones of said application information data stored in said protected memory area;

wherein said application information data stored in said protected memory area are each readable and writable by an application program corresponding to said application information data and are not readable and writable by said generic access application program of said electronic device, and said display information data stored in said unprotected memory area are readable by said generic access application program of said electronic device.

2. An IC card according to claim 1, wherein said display information data stored in said unprotected memory area have a lower access security level than a security level of said application information data stored in said protected memory area.

3. An IC card according to claim 1, wherein said display information data stored in said unprotected memory area are at least one of a copy and translation of at least portions of said application information data stored in said protected memory area.

4. An IC card according to claim 1, wherein said application information data stored in said protected memory area are master record data having a first predetermined level of security and pertaining to at least one of electronic money, banking information, financial information, incentive program information and personal information of an IC card user, and wherein said display information data stored in said unprotected memory area are at least partially derived from said master record data.

5. An IC card according to claim 4, wherein said display information data are character code display data formed according to a predetermined standardized format.

6. An IC card according to claim 1, wherein said IC card is constructed such that, when said application information data are updated, said display information data are correspondingly updated.

7. An IC card according to claim 1, further comprising an internal IC card processor, wherein said IC card is adapted such that, updating is performed by said IC card processor, and when said application information data are updated, said display information data are correspondingly updated by said IC card processor.

8. An IC card according to claim 1, wherein said IC card is constructed and operational in conformance with an International Standardization Organization/International Electrotechnical Commission (ISO/IEC) 7816 International Standard, wherein said application information data are stored in an elementary file defined by such standard, and said display information data are stored in at least one of a directory file, an answer-to-reset file and said elementary file all defined by such standard.

9. An IC card according to claim 1, wherein said application information data are stored in a predetermined encrypted form, and said display information data are stored in non-encrypted form.

10. An IC card according to claim 1, wherein said application information data are stored in a state that may be exported from the IC card as response data in response to input of command data from outside the IC card.

11. An IC card according to claim 1, further comprising at least one application information controller program which controls said application information data, with said display information data being read when any said application information controller program is selected.

12. An IC card according to claim 1, further comprising at least one application information controller program which controls said application information data, with said display information data being read when any said application information controller program is selected and specific command information is transmitted to said IC card.

13. An IC card according to claim 1, wherein any respective said application information data stored in said protected memory area are readable and writable only by a said application program corresponding to the respective said application information data.

14. An IC card according to claim 1, wherein said display information data stored in said unprotected memory area are writable by said application program and are not writable by said generic access application program.

15. An IC card according to claim 1, wherein at least one of said application information data and said display information data are stored in a predetermined encrypted form.

16. An IC card according to claim 1, wherein said generic access application program is a display control program stored in said electronic device.

17. An IC card according to claim 1, wherein said application information data and said application program are addable after manufacturing of said IC card.

18. An IC card according to claim 1, wherein said display information data is stored in a predetermined portion of said unprotected memory area.

19. An IC card having a non-volatile memory, comprising:

a protected memory area in said non-volatile memory, to store application specific data for at least one application program and to protect the application specific data from unauthorized change; and an unprotected memory area in said non-volatile memory, to store generic access application program data which mirrors at least a portion of said application specific data in that such generic access application program data are created and updated on a basis of said application specific data stored in said protected memory area, said generic access application program data being accessible by a generic access application program of an electronic device interfaceable with the IC card;

wherein said application specific data stored in said protected memory area are each readable and writable by an application program corresponding to said application specific data and not readable and writable by said generic access application program of said electronic device, and said generic access application program data stored in said unprotected memory area are readable by said generic access application program of said electronic device.

* * * * *